(12) United States Patent
Braml et al.

(10) Patent No.: US 7,573,174 B2
(45) Date of Patent: Aug. 11, 2009

(54) UNIVERSAL MOTOR WITH A DEVICE FOR REMOVING DUST

(75) Inventors: Georg Braml, Landsberg (DE); Frank Fritsch, Kaufering (DE); Helmut Burger, Moorenweis (DE); Oliver Ohlendorf, Landsberg (DE)

(73) Assignee: Hilti Aktiengellschaft, Schaan (LI)

( * ) Notice: Subject to any disclaimer, the term of this patent is extended or adjusted under 35 U.S.C. 154(b) by 69 days.

(21) Appl. No.: 11/823,911

(22) Filed: Jun. 28, 2007

(65) Prior Publication Data
US 2008/0001493 A1 Jan. 3, 2008

(30) Foreign Application Priority Data
Jun. 29, 2006 (DE) .................. 10 2006 000 315

(51) Int. Cl.
*H02K 13/00* (2006.01)
(52) U.S. Cl. ........................ 310/239; 310/88
(58) Field of Classification Search .............. 310/58, 310/88, 158, 239
See application file for complete search history.

(56) References Cited

U.S. PATENT DOCUMENTS

| | | | |
|---|---|---|---|
| 5,650,683 A * | 7/1997 | Shiga et al. ............... 310/201 |
| 6,097,128 A | 8/2000 | Ko | |
| 6,586,855 B2 * | 7/2003 | Burger et al. .............. 310/88 |
| 7,102,266 B2 * | 9/2006 | Coles ..................... 310/239 |
| 7,132,777 B2 * | 11/2006 | Finkenbinder et al. ...... 310/239 |
| 2007/0159023 A1 * | 7/2007 | Eisert et al. .............. 310/239 |

FOREIGN PATENT DOCUMENTS

JP 360229648 A * 11/1985

\* cited by examiner

*Primary Examiner*—Michael C Zarroli
(74) *Attorney, Agent, or Firm*—Abelman, Frayne & Schwab

(57) ABSTRACT

A universal motor (2) includes at least two carbon brushes (36) contacting the commutator (14), a ventilation device (12) for producing a cooling flow (K), and a dust protection arrangement for preventing penetration of material particles (M) into the commutation region (34) and including at least one guide member (26) that provides for delivering of the material particles (M) in the cooling flow (K), with the at least one guide member (26) having a smooth concave guide surface (28) located between the two carbon brushes (36) and extending adjacent to an outer surface (30) of the commutator (14) and toward a suction opening (22) connected with the cooling flow path (24).

8 Claims, 2 Drawing Sheets

UNIVERSAL MOTOR WITH A DEVICE FOR REMOVING DUST

BACKGROUND OF THE INVENTION

1. Field of the Invention

The present invention relates to a universal motor having a commutator, at least two carbon brushes electrically contacting the commutator in respective commutation regions, a ventilation device for producing a cooling flow in a cooling flow path, and dust protection means for preventing penetration of material particles such as dust and the like, in particular, produced during operation of a hand-held power tool, into the commutation region and including at least one guide member that provides for delivering of the material particles in the cooling flow.

2. Description of the Prior Art

In universal motors of the type discussed above, the commutation regions are protected by the dust protection means from the erosion action of the material particles, which increases the service life of the motors.

U.S. Pat. No. 6,097,128 discloses a universal motor with two carbon brushes held in respective brush guides. Hood members are pushed over the brush guides, around the carbon brushes, forming a partially closed chamber. To remove the carbon dust, which is carried from the carbon brushes, an air flow from the chamber and into the cooling air flow is produced by providing flow openings in the hood members, with the air flow carrying away the dust laden air.

The drawback of the known universal motor consists in that the guide members, which are formed by hood members, have a relatively complex construction, which involves additional manufacturing costs. In addition, the provided dust protection means is not suitable for removing large amounts of material particles from the commutation region, which are produced when, e.g., hand-held power tools, in particular drills or chisel tools are used. This is because of high flow losses within the guide members and a rapid dust deposition.

Accordingly, an object of the present invention is to provide a universal motor in which the drawbacks of the known universal motor are eliminated.

Another object of the present invention is to provide a universal motor in which a better removal of material particles from the commutation regions is achieved, together with reduction of additional costs associated with dust removal.

SUMMARY OF THE INVENTION

This and other objects of the present invention, which will become apparent hereinafter, are achieved by providing a universal motor in which the guide member has a smooth concave guide surface located between the two carbon brushes and extending adjacent to an outer surface of the commutator and toward a suction opening connected with the cooling flow path. The guide surface is mathematically smooth, i.e., is without any steps, and extends adjacent to the commutator outer surface in the radial direction. With such guide surface, during operation, the circumferential speed of the commutator accelerates an air layer between the commutator outer surface and the guide surface in the tangential direction, i.e., in the circumferential direction. The material particles, which are carried by this air layer, are pressed against the guide surface due to their inertia in accordance with a cyclone effect, and are displaced along the guide surface in a direction toward the suction opening. In this way, with a simple and economically produced guide member, a better removal of material particles is achieved. Thereby, there is provided a universal motor the service life of which is increased even when the motor is used in a hand-held power tool and operates in a heavily dust-laden environment.

Advantageously, the guide surface extends over an angular region of at least 45° of the outer surface of the commutator. This insures an adequate segregation between the guide surface and the commutator.

According to a particularly advantageous embodiment of the present invention, the distance between the guide surface and the outer surface of the commutator diminishes in a direction of the suction opening. Thereby, a certain nozzle effect is achieved. The nozzle effect increases the speed of the air layer between the guide surface and the commutator as the air layer is displaced toward the suction opening, which also increase segregation.

Advantageously, a transversely extending baffle member is provided on a side of the suction opening remote, in the circumferential direction, from the guide member. The baffle member insures a reliable entry of the material particles, which are carried by the air layer, in the suction opening.

Advantageously, the baffle member is arranged on a side of the brush guide adjacent to the suction opening. Thereby, a respective carbon brush can be reliably shielded from material particles carried by the air layer adjacent to the outer surface of the commutator.

Advantageously, there are provided two suction openings, two guide members associated with the at least two carbon brushes, respectively, and two transversely extending baffle members are provided on sides of respective suction openings, remote, in the circumferential direction, from the respective guide members. Thereby, both commutation regions are operatively protected from the material particles.

Advantageously, the baffle member is held on the brush holder and the at least one guide member and the suction opening are formed in a motor housing. Thereby, a precise positioning of the baffle member relative to the associated carbon brush and an exact positioning of the guide surface relative to the suction opening are insured.

In a particularly advantageous embodiment of the invention, the baffle member, the guide member, and the suction opening are provided on the brush holder. This insures an easy mounting of the dust protection means, together with the brush holder.

It is advantageous when each of the carbon brushes, has on both sides in a circumferential direction, respectively, a baffle member, a guide member and a suction opening. This insures a dust protection of a universal motor rotatable in opposite directions.

The novel features of the present invention, which are considered as characteristic for the invention, are set forth in the appended claims. The invention itself, however, both as to its construction and its mode of operation, together with additional advantages and objects thereof, will be best understood from the following detailed description of the preferred embodiment, when read with reference to the accompanying drawings.

DETAILED DESCRIPTION OF THE PREFERRED EMBODIMENT

Figure 1:
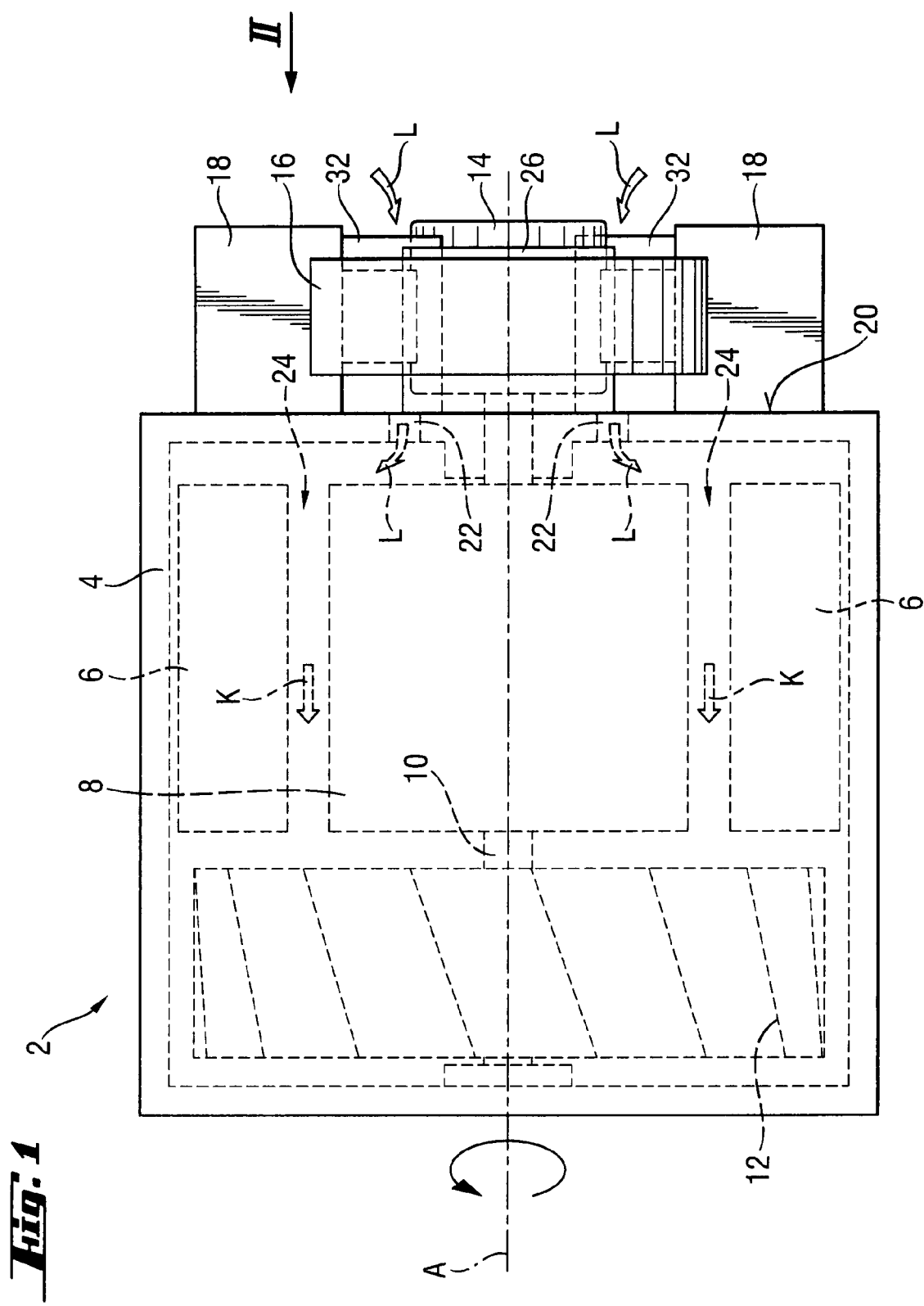
FIG. 1 a schematic view of a universal motor according to the present invention.

A universal motor 2 according to the present invention, which is shown in FIG. 1, is designed for use in a electrically operated hand-held power tool such as, e.g., drill or chisel power tool. The universal motor 2 has a housing 4 in which a stator 6, a rotor 8, and a ventilation device 12, which is mounted on the motor shaft 10, are located. On an end of the motor shaft 10 remote from the ventilation device 12 and extending outside of the motor housing 4, a commutator 14 is arranged. Around the commutator 14, an annular brush holder 16, which supports two brush guides 18, is provided.

In a wall 20 of the motor housing 4 adjacent to the commutator 14, there are provided two suction openings 22. When during an operation of the universal motor 2, the ventilation device 12 is rotated about a motor axis A in order to generate a cooling flow K along a cooling flow path 24, air from the commutator 14 enters in the motor housing 4 through the suction openings 22, as shown with arrows L. The suction openings 22 can form themselves a portion of the cooling air path 24 or, as shown, form transitional sections, whereby the cooling flow K enters the motor housing 4 sidewise, as shown in FIG. 2

Figure 2:
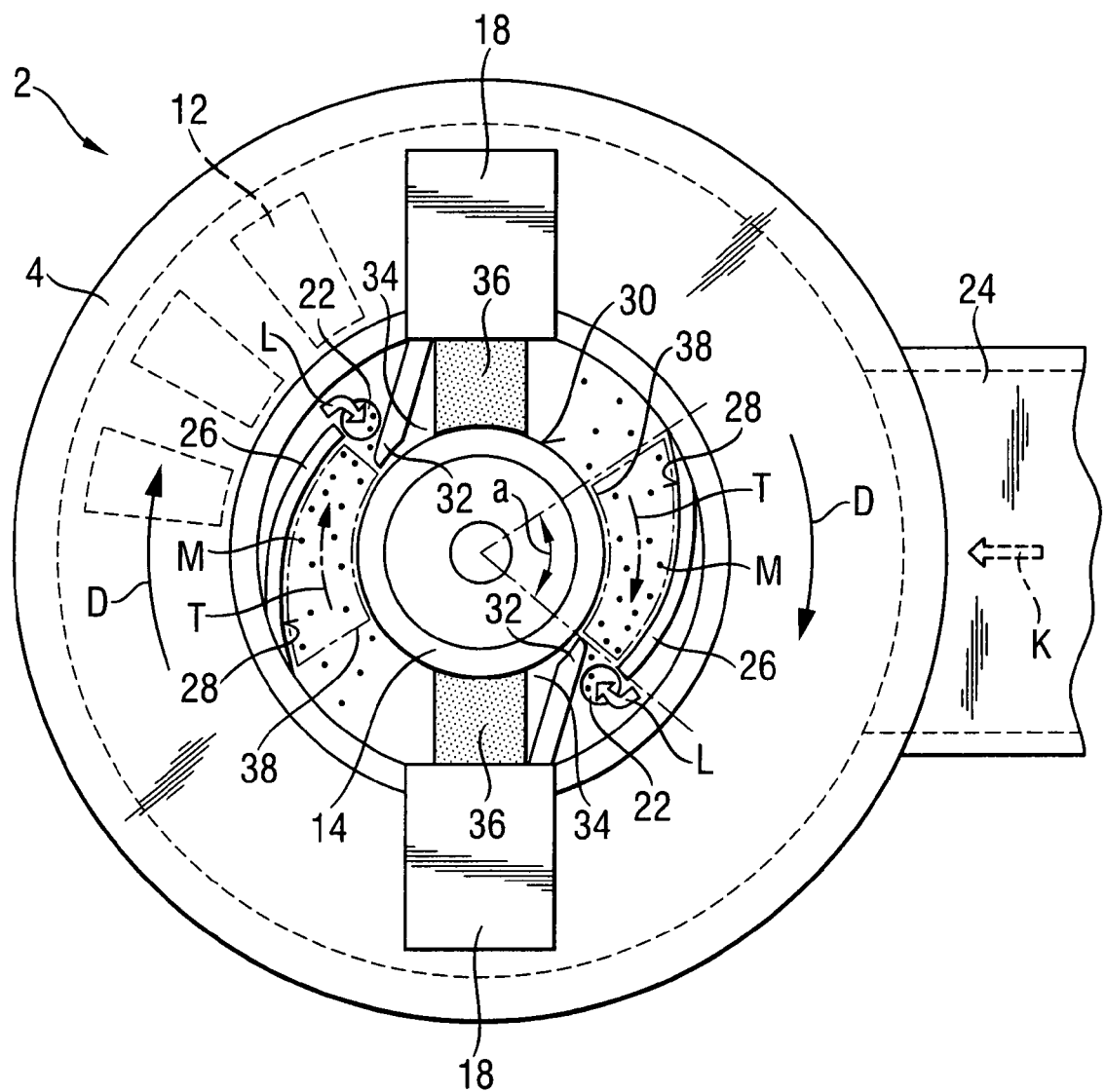
FIG. 2 a plan view of dust protection means of the inventive universal motor in direction II in FIG. 1.

As particularly shown in FIG. 2, the brush holder 16 supports two guide members 26 which form, on their sides adjacent to the commutator 14, concave guide surfaces 28. The radial distance of the guide surfaces 28 from the outer surface 30 of the commutator 14 diminishes in a rotational direction D of the commutator 14. The guide surfaces 28 extend, in the rotational direction D, toward respective suction openings 22 and extend over an angular region of over 45°.

On a side of the suction openings 22 remote, in a circumferential direction, from respective guide members 26, there are provided respective baffle members 32. The baffle members 32 extend from respective brush guides 18 toward the outer surface 30 of the commutator 14. Each baffle member 32 is spaced from the outer surface 30 of the commutator 14, at its end adjacent to the commutator 14, by a distance smaller than the distance by which a respective end of the respective guide member 26 is spaced from the outer surface 30. Thereby, the baffle member 32 shields a commutation region 34 formed between a carbon brush 36 which is held in a respective brush guide 18, and the outer surface 30.

During an operation, in many cases, material particles M, such as dust particles of a removable material, brush dust, or larger material pieces can reach the region of the comutator 14. Due to rotation of the commutator 14, in a region 38 adjacent to the outer surface 30 of the commutator 14, a tangential flow T in the rotational direction D is generated. This tangential flow T carries the material particles M. The reduction of the radial distance between the outer surface 30 of the commutator 14 and the guide surface 28 produces a nozzle effect that amplifies the tangential flow T.

As a result of a stronger tangential flow T, the carried, with the flow, material particles M are accelerated and, as a result of their inertia, are pressed against a respective guide surface 28. The particles are carried along the respective guide surface 28 to a respective suction opening 22 to which the respective guide surface 28 extends. At the opening 22, as a result of the connection of the opening 22 with the cooling flow path 24, a vacuum is produced which provides for suction of the material particles M in the cooling flow K of the motor housing 4. The baffle members 32 prevent suction of the material particles M through the opening 22 into respective commutation regions 34.

The guide members 26, the suction openings 22, and the baffle members 32 form together dust protection means. The dust protection means reduces, during an operation of the power tool, the amount of material particles M in the commutator regions 34, which minimizes the erosion action of the particles, increasing the service life of the universal motor 2.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. A universal motor (2) comprising:
    a commutator (14) having a motor axis (A);
    at least two carbon brushes (36) contacting the commutator (14) in respective commutation regions (34);
    a ventilation device (12) for producing a cooling flow (K) in a cooling flow path (24);
    dust protection means for preventing penetration of material particles (M) into the commutation regions (34) and including at least one guide member (26) that provides for delivering of the material particles (M) in the cooling flow (K), the at least one guide member (26) having a smooth concave guide surface (28) located between the two carbon brushes (36) and extending adjacent to an outer surface (30) of the commutator (14) and toward a suction opening (22) connected with the cooling flow path (24); and
    a baffle member (32) provided on a side of the suction opening (22) with the baffle member (32) being located remote, in the circumferential direction, from the guide member (26) and extending in a transverse direction relative to the motor axis (A).

2. A universal motor according to claim 1, wherein the guide surface (28) extends over an angular region (a) of at least 45° of the outer surface (30) of the commutator (14).

3. A universal motor according to claim 1, wherein distance between the guide surface (28) and the outer surface (30) of the commutator (14) diminishes in a direction of the suction opening (22).

4. A universal motor according to claim 1, further comprising a pair of brush guides (18) with each brush guide (18) for each of the carbon brushes (36), and wherein the baffle member (32) is arranged on a side of the brush guides (18) adjacent to the suction opening (22).

5. A universal motor according to claim 1, wherein there are provided two suction openings (22) and two guide members (26) associated with the at least two carbon brushes (36), respectively, and the baffle member (32) includes two baffle members (32) each provided on sides of the respective suction openings (22) with the baffle members (32) being located remote, in the circumferential direction, from the respective guide members (26) and extending in a transverse direction relative to the motor axis (A).

6. A universal motor according to claim 1, further comprising a pair of brush holders (16) each holding a respective one of the at least two carbon brushes (36), and wherein the baffle (32) is held on the pair of brush holders (16), and the at least one guide member (26) and the suction opening (22) are formed in a motor housing (4).

7. A universal motor according to claim 1, further comprising a pair of brush holders (16), and wherein the baffle member (32), the at least one guide member (26), and the suction opening (22) are provided on the pair of brush holders (16).

8. A universal motor according to claim 7, further comprising a pair of baffle members (32), a pair of guide members (26), and a pair of suction openings (22); and wherein each of the carbon brushes (36) has, on each of a pair of sides thereof in a circumferential direction, respectively, one of the pair of baffle members (32), one of the pair of guide members (26), and one of the pair of suction openings (22).

* * * * *